(12) United States Patent
Sel (10) Patent No.: US 11,991,189 B2
(45) Date of Patent: May 21, 2024

(54) INTRUSION DETECTION FOR COMPUTER SYSTEMS

(71) Applicant: Siemens Aktiengesellschaft, Munich (DE)

(72) Inventor: Tolga Sel, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 350 days.

(21) Appl. No.: 17/441,394

(22) PCT Filed: Mar. 11, 2020

(86) PCT No.: PCT/EP2020/056454
§ 371 (c)(1),
(2) Date: Sep. 21, 2021

(87) PCT Pub. No.: WO2020/193136
PCT Pub. Date: Oct. 1, 2020

(65) Prior Publication Data
US 2022/0174077 A1    Jun. 2, 2022

(30) Foreign Application Priority Data

Mar. 22, 2019 (EP) .................................... 19164617

(51) Int. Cl.
*H04L 29/06* (2006.01)
*H04L 9/40* (2022.01)

(52) U.S. Cl.
CPC ................................ *H04L 63/1416* (2013.01)

(58) Field of Classification Search
CPC ............. H04L 63/1416; H04L 63/1408; G06F 21/552
See application file for complete search history.

(56) References Cited

U.S. PATENT DOCUMENTS

| 7,127,743 B1* | 10/2006 | Khanolkar | G06F 21/552 709/224 |
| 2006/0021055 A1* | 1/2006 | Judge | H04L 63/20 726/25 |
| 2008/0066178 A1* | 3/2008 | Jin | G06F 21/14 726/23 |

(Continued)

FOREIGN PATENT DOCUMENTS

| CN | 101176331 A | 5/2008 |
| CN | 108306893 A | 7/2018 |

OTHER PUBLICATIONS

Anonymous: "Cisco Smart Software Licensing: Overview and Deployment Options White Paper—Cisco", Jan. 10, 2019 (Jan. 10, 2019), XP055607867, (Year: 2019).*

(Continued)

*Primary Examiner* — Ka Shan Choy
(74) *Attorney, Agent, or Firm* — Lempia Summerfield Katz LLC (57) ABSTRACT

The disclosure relates to an analysis device configured to communicate with at least one node of an infrastructure of a distributed database via the communication interface in order to obtain authorization to detect intrusion of a computer system. The analysis device is also configured to detect, depending on whether the authorization is obtained, intrusion of the computer system based on an analysis of log messages of the computer system.

15 Claims, 3 Drawing Sheets

(56) References Cited

U.S. PATENT DOCUMENTS

| | | | | |
|---|---|---|---|---|
| 2012/0297489 | A1 | 11/2012 | Dequevy | |
| 2014/0026199 | A1* | 1/2014 | Nachenberg | H04L 63/08 726/6 |
| 2017/0139806 | A1* | 5/2017 | Xu | G06F 11/3612 |
| 2020/0014528 | A1* | 1/2020 | Nandakumar | H04L 63/123 |
| 2021/0174253 | A1* | 6/2021 | Moore | G06N 7/01 |

OTHER PUBLICATIONS

SolarWinds Worldwide, LLC. "Centralizing Windows Logos—The Ultimate Guide to logging," Feb. 24, 2018. pp. 1-24.

Anderson Ross: "Security Engineering. A Guide to Building Dependable Distributed Systems"; Wiley; Jan. 2001; 2001; pp. 1-604.

Andreas M. Antonopoulos "Mastering Bitcoin: Unlocking Digital Cryptocurrencies", O'Reilly Media, Dec. 2014. pp. 1-282.

Andreas M. Antonopoulos, Gavin Wood "The Ethereum Book Project/Mastering Ethereum" https://github.com/ethereumbook/ethereumbook, Oct. 2017; pp. 1-362.

Anonymous: "Centralizing Windows Logs—The Ultimate Guide to Logging", XP055608063; URL:https://web.archive.org/web/20180224162249/https://www.loggly.com/ultimate-guide/centralizing-windows-logs/, p. 1-20; 2018.

Anonymous: "Cisco Smart Software Licensing: Overview and Deployment Options White Paper—Cisco", XP055607867: URL:https://www.cisco.com/c/en/us/products/collateral/software/smart-accounts/whitepaper-cll-741659.html, p. 1-6; 2019.

Anonymous: "Understanding the Active Directory Logical Model: Microsoft Docs", XP055607667: URL:https://docs.microsoft.com/en-us/windows-server/identity/ad-ds/plan/understanding-the-active-directory-logical-model, p. 1-3; 2017.

Baird Leemon: "Overview of Swirlds Hashgraph", Swirlds; May 2016. pp. 1-4.

Baird, Leemon. "The swirlds hashgraph consensus algorithm: Fair, fast, byzantine fault tolerance." Swirlds Tech Reports SWIRLDS-TR-2016-01, Tech. Rep (2016). pp. 1-28.

Blockchainhub: "Blockchain Oracles", https://blockchainhub.net/blockchain-oracles/; 2018. pp. 1-6.

Deokar, Bhagyashree, and Ambarish Hazarnis. "Intrusion detection system using log files and reinforcement learning." International Journal of Computer Applications 45.19 (2012): 28-35.

Diedrich, Henning "Ethereum: Blockchains, Digital Assets, Smart Contracts, Decentralized Autonomous Organizations" CreateSpace Independent Publishing Platform, Sep. 8, 2016 // ISBN-10: 1523930-470 // ISBN-13: 978-1523930470. Abstract.

International Search Report and the Written Opinion for International Patent Application PCT/EP2020/056454 dated Jun. 4, 2020.

Needham, Roger M., and Michael D. Schroeder. "Using encryption for authentication in large networks of computers." Communications of the ACM 21.12 (1978): 993-999.

* cited by examiner

INTRUSION DETECTION FOR COMPUTER SYSTEMS

The present patent document is a § 371 nationalization of PCT Application Serial No. PCT/EP2020/056454, filed Mar. 11, 2020, designating the United States, which is hereby incorporated by reference, and this patent document also claims the benefit of European Patent Application No. 19164617.3, filed Mar. 22, 2019, which is also hereby incorporated by reference.

TECHNICAL FIELD

The disclosure relates to techniques for intrusion detection for computer systems on the basis of an analysis of log messages of the computer system. Various examples relate to the use of a distributed database in association with the intrusion detection.

BACKGROUND

An analysis device for intrusion detection (referred to as Intrusion Detection System or IDS) is a device which monitors computer systems (e.g., individual computers or networks including a plurality of computers) and aims to detect attacks. IDSs may use two different techniques for detecting attacks. First, signature-based attack detection uses attack patterns stored in a database in order to monitor the active computer system. Attacks are identified by comparing attack signatures from the database with the active system behavior. If the stored attack signature corresponds to the current system behavior, then the IDS infers an attack. Second, anomaly-based IDS techniques attempt to detect attacks by detecting changes in the system behavior of the computer system. That means that the IDS learns/analyzes the normal behavior of the computer system (or a trustworthy third entity learns the normal behavior) in the first act, in order to compare the active behavior of the system with the previously learned normal behavior in the second act. If the current behavior deviates from the previously learned normal behavior, then this may be rated as an anomaly and, under certain circumstances, is an indication of an attack or that the computer system is compromised. The decision as to whether the system has deviated from the normal behavior may be realized by statistical methods or algorithms of machine learning.

A host-based IDS (HIDS) is installed on a computer system and gathers information about the operating state thereof in order to detect attacks with the aid of this information. A network-based IDS (referred to as network-based Intrusion Detection System or NIDS) attempts to discover attacks by analyzing the network traffic. Log messages of the current system behavior may be created both in the case of the RIDS and in the case of the NIDS. Log messages document the system behavior. These log messages are subsequently analyzed and assessed by the IDS. The result of this analysis provides information about whether or not an attacker was/is active.

Such previously known techniques have certain disadvantages and limitations. Attackers who gain control over a computer system or the IDS may manipulate the analysis of the log messages. Specifically that means that, although the log messages include indications about an attacker, the result of the analysis is not correct because the attacker has gained control of the IDS in the meantime and the result has accordingly been tampered with. That means that known IDSs may have limited security vis-à-vis manipulation.

BRIEF SUMMARY

Therefore, there is a need for improved techniques for intrusion detection of a computer system. In particular, there is a need for secure and efficient techniques for intrusion detection.

The scope of the present disclosure is defined solely by the appended claims and is not affected to any degree by the statements within this summary. The present embodiments may obviate one or more of the drawbacks or limitations in the related art.

The technology of blockchains or "distributed ledgers" is currently a technology that is being intensively discussed and that may be realized in particular as a distributed database system. Besides applications for decentralized payment systems (e.g., Bitcoin), new application possibilities are being developed in the financial industry. In particular, transactions between companies may be realized by this means without mediators or a clearing house, in a manner protected against manipulation. This enables new business models without a trustworthy mediator, it reduces the transaction costs, and new digital services may be offered in a flexible manner, without the need to set up trust relationships and an infrastructure set up specifically for this. A transaction data set (or transaction for short) protected by a blockchain includes program code, for example, which may also be referred to as a so-called "smart contract".

An IDS includes a processor and a communication interface. In this case, the processor is configured to load program code from a memory and to execute it and to perform the following acts on the basis thereof: communicating with at least one node of an infrastructure of a distributed database via the communication interface in order to obtain an authorization for intrusion detection for a computer system; and depending on whether the authorization is obtained: carrying out the intrusion detection for the computer system on the basis of an analysis of log messages of the computer system which are received from the computer system via the communication interface.

A method includes communicating with at least one node of an infrastructure of a distributed database in order to obtain an authorization for intrusion detection for a computer system. The method also includes, depending on whether the authorization is obtained, carrying out the intrusion detection for the computer system on the basis of an analysis of log messages of the computer system which are received from the computer system.

A computer program or a computer program product or a computer-readable storage medium includes program code. The program code may be executed by a processor. That has the effect that the processor performs a method including communicating with at least one node of an infrastructure of a distributed database in order to obtain an authorization for intrusion detection for a computer system. The method also includes, depending on whether the authorization is obtained, carrying out the intrusion detection for the computer system on the basis of an analysis of log messages of the computer system which are received from the computer system.

A node of an infrastructure of a distributed database includes a processor and a communication interface. In this case, the processor is configured to load program code from a memory and to execute it and to perform the following acts on the basis thereof: implementing a smart contract in order to obtain a corresponding result value; selecting at least one IDS from a plurality of IDSs depending on the result value; and communicating with the at least one IDS via the communication interface in order to grant the at least one IDS an authorization for intrusion detection for a computer system.

A method includes: implementing a smart contract in order to obtain a corresponding result value; selecting at least one IDS from a plurality of IDSs depending on the result value; and communicating with the at least one IDS in order to grant the at least one IDS an authorization for intrusion detection for a computer system.

A computer program or a computer program product or a computer-readable storage medium includes program code. The program code may be executed by a processor. That has the effect that the processor performs a method including: implementing a smart contract in order to obtain a corresponding result value; selecting at least one IDS from a plurality of IDSs depending on the result value; and communicating with the at least one IDS in order to grant the at least one IDS an authorization for intrusion detection for a computer system.

A computer system includes a processor and a communication interface, wherein the processor is configured to load program code from a memory and to execute it, and to perform the following acts on the basis thereof: receiving registration information from an IDS via the communication interface. In this case, the registration information is indicative of an identity of the IDS. The processor is also configured to initiate a verification of the registration information, for instance by comparison with a corresponding entry in a distributed database. The processor is also configured, depending on a result of the verification, to transfer log messages of the computer system to the IDS and via the communication interface.

A method includes: receiving registration information from an IDS, wherein the registration information is indicative of an identity of the IDS; initiating a verification of the registration information, for instance by comparison with a corresponding entry in a distributed database or else an infrastructure of a public key material (referred to as public-key infrastructure); and depending on a result of the verification, transferring log messages of the computer system to the IDS.

A computer program or a computer program product or a computer-readable storage medium includes program code. The program code may be executed by a processor. That has the effect that the processor performs a method including: receiving registration information from an IDS, wherein the registration information is indicative of an identity of the IDS; initiating a verification of the registration information, for instance by comparison with a corresponding entry in a distributed database; and depending on a result of the verification, transferring log messages of the computer system to the IDS.

Unless indicated otherwise in the following description, the terms "carry out", "calculate", "computer-aided", "compute", "ascertain", "generate", "configure", "reconstruct", and the like may relate to actions and/or processes and/or processing acts which change and/or generate data and/or convert data into other data, wherein the data may be represented or be present in particular as physical variables, for example, as electrical pulses. In particular, the expression "computer" may be interpreted as broadly as possible to cover in particular all electronic devices having data processing properties. Computers may thus be for example personal computers, servers, programmable logic controllers (PLCs), embedded systems, microcontrollers, handheld computer systems, pocket PC devices, mobile radio devices and other communication devices which may process data in a computer-aided manner, processors, and other electronic devices for data processing.

As disclosed herein, "computer-aided" may refer to an implementation of the method in which in particular a processor performs at least one method act of the method.

As disclosed herein, a processor may refer to a machine or an electronic circuit. A processor may be a central processing unit (CPU), a microprocessor, or a microcontroller, for example, an application-specific integrated circuit or a digital signal processor, possibly in combination with a storage unit for storing program instructions, etc. A processor may also be an IC (Integrated Circuit), in particular an FPGA (Field Programmable Gate Array) or an ASIC (Application-Specific Integrated Circuit), or a DSP (Digital Signal Processor), or a graphic processing unit (GPU). Moreover, a processor may refer to a virtualized processor, a virtual machine, or a soft CPU. It may also be a programmable processor equipped with configuration acts for performing the stated method or is configured with configuration acts in such a way that the programmable processor implements the features of the method, of the component, of the modules, or of other aspects and/or partial aspects of the disclosure.

As disclosed herein, a "memory", a "storage unit" or "storage module" and the like may refer to a volatile memory in the form of main memory (Random-Access Memory, RAM) or a permanent memory such as a hard disk or a data carrier.

As disclosed herein, a "module" may refer to a processor and/or a storage unit for storing program instructions. By way of example, the processor is specifically designed to execute the program instructions in such a way that the processor executes functions for implementing or realizing the method or an act of the method. A module may also be a node of the distributed database system that realizes, for example, the specific functions/features of a corresponding module. The respective modules may also be embodied as separate or independent modules. For this purpose, the corresponding modules may include further elements, for example. These elements are for example one or more interfaces (e.g., database interfaces, communication interfaces—e.g., network interface, WLAN interface) and/or an evaluation unit (e.g., a processor) and/or a storage unit. By the interfaces, for example, data may be exchanged (e.g., received, communicated, transmitted, or provided). By the evaluation unit, data may be compared, checked, processed, assigned, or calculated in a computer-aided manner and/or in an automated manner. By the storage unit, data may be stored, retrieved, or provided, for example, in a computer-aided manner and/or in an automated manner.

As disclosed herein, "comprise", in particular with regard to data and/or information, may refer to (e.g., computer-aided) storage of corresponding information and/or of a corresponding datum in a data structure/data set (which, e.g., is in turn stored in a storage unit).

As disclosed herein, "assign", in particular with regard to data and/or information, may refer to a computer-aided assignment of data and/or information. By way of example, a first datum, for this purpose, by a storage address or a unique identifier (UID), is assigned a second datum, e.g., by the first datum being stored together with the storage address or the unique identifier of the second datum together in a data set.

As disclosed herein, "provide", in particular with regard to data and/or information, may refer to computer-aided providing. The providing may be effected via an interface (e.g., a database interface, a network interface, an interface to a storage unit). Via the interface, (e.g., during the providing), corresponding data and/or information may be communicated and/or transmitted and/or retrieved and/or received.

As disclosed herein, "provide" may refer to loading or storing, for example, a transaction with corresponding data. This may be done on or by a storage module. "Providing" may refer to transferring (or transmitting or communicating) corresponding data from one node to another node of the blockchain or of the distributed database system (or the infrastructure thereof).

As disclosed herein, "implementing a smart contract" or a "smart contract process" may refer to execution of a program code (e.g., of the control commands) in a process by the distributed database system or the infrastructure thereof.

As disclosed herein, a "checksum", (e.g., a data block checksum, a data checksum, a node checksum, a transaction checksum, a linking checksum, or the like), may refer to a cryptographic checksum or cryptographic hash or hash value that is formed or calculated in particular by a cryptographic hash function by way of a data set and/or data and/or one or more of the transactions and/or a partial area of a data block (e.g., the block header of a block of a blockchain or data block header of a data block of the distributed database system or only a portion of the transactions of a data block). A checksum may be checksum(s) or hash value(s) of a hash tree (e.g., Merkle tree, Patricia tree). Furthermore, a checksum may refer to a digital signature or a cryptographic message authentication code. By the checksums, at different levels of the database system, for example, it is possible to realize cryptographic protection/protection against manipulation for the transactions and the data (sets) stored therein. If high security is required, for example, the checksums are generated and checked at the transaction level, for example. If the security required is not as high, the checksums are generated and checked, for example, at the block level (e.g., over the entire data block or only over a portion of the data block and/or a portion of the transactions).

As disclosed herein, a "data block checksum" may refer to a checksum that is calculated, for example, over a portion or all transactions of a data block. A node may then check/establish the integrity/authenticity of the corresponding portion of a data block by the data block checksum, for example. Additionally, or alternatively, the data block checksum may also have been formed over transactions of a preceding data block/predecessor data block of the data block. In this case, the data block checksum may also be realized by a hash tree, (e.g., a Merkle tree or a Patricia tree), wherein the data block checksum is in particular the root checksum of the Merkle tree or of a Patricia tree or of a binary hash tree. In particular, transactions are safeguarded by further checksums from the Merkle tree or Patricia tree (e.g., using the transaction checksums), wherein in particular the further checksums are leaves in the Merkle tree or Patricia tree. The data block checksum may thus safeguard the transactions, for example, by the root checksum being formed from the further checksums. The data block checksum may be calculated in particular for transactions of a specific data block of the data blocks. In particular, such a data block checksum may influence a data block succeeding the specific data block in order to link this succeeding data block, for example, with its preceding data blocks and in particular thus to make an integrity of the distributed database system checkable. By this process, the data block checksum may perform the function of the linking checksum or influence the linking checksum. The header of a data block (e.g., of a new data block or of the data block for which the data block checksum was formed) may include the data block checksum, for example.

As disclosed herein, "transaction checksum" may refer to a checksum formed in particular over a transaction of a data block. In addition, for example, a calculation of a data block checksum for a corresponding data block may be accelerated because, for this purpose, already calculated transaction checksums may be used straightaway as leaves of a Merkle tree.

As disclosed herein, a "linking checksum" may refer to a checksum which indicates or references in particular a respective data block of the distributed database system the preceding data block of the distributed database system (e.g., referred to as "previous block hash"). For this purpose, a corresponding linking checksum is formed in particular for the corresponding preceding data block. As linking checksum, for example, a transaction checksum or the data block checksum of a data block (that is to say a present data block of the distributed database system) may be used to link a new data block with a (present) data block of the distributed database system. However, it is also possible, for example, for a checksum to be formed over a header of the preceding data block or over the entire preceding data block and to be used as linking checksum. This may also be calculated for a plurality or all of the preceding data blocks. It is also possible to realize a procedure, for example, in which the linking checksum is formed over the header of a data block and the data block checksum. However, a respective data block of the distributed database system may include in each case a linking checksum which was calculated for, or refers to, a data block preceding the respective data block, (e.g., the data block directly preceding the respective data block). It is also possible, for example, for a corresponding linking checksum also to be formed only over a portion of the corresponding data block (e.g., preceding data block). As a result, a data block including an integrity-protected portion and an unprotected portion may be realized, for example. A data block whose integrity-protected portion is invariable and whose unprotected portion may also still be changed later may thus be realized, for example. In this case, integrity-protected may be understood to mean that an alteration of integrity-protected data is able to be established by a checksum.

The data which are stored in a transaction of a data block, for example, may be provided in various ways. Instead of the data, e.g., user data such as measurement data or data/ownership concerning assets, for example, a transaction of a data block may include only the checksum for these data. In this case, the corresponding checksum may be realized in various ways. This may be a corresponding data block checksum of a data block (with the corresponding data) of a different database or of the distributed database system, a transaction checksum of a data block with the corresponding data (of the distributed database system or of a different database) or a data checksum that was formed over the data.

In addition, the corresponding transaction may also include a reference or an indication concerning a storage location (e.g., an address of a file server and indications of where the corresponding data may be found on the file server; or an address of a different distributed database including the data). The corresponding data may then also be provided in a further transaction of a further data block of the distributed database system (e.g., if the corresponding data and the associated checksums are included in different data blocks). However, it is also conceivable, for example, for these data to be provided via a different communication channel (e.g., via a different database and/or a cryptographically secure communication channel).

Moreover, in addition to the checksum, for example, it is possible to store an additional data set (e.g., a reference or an indication concerning a storage location) in the corresponding transactions, which indicates in particular a storage location where the data may be retrieved. That is advantageous so as to minimize a data size of the blockchain or of the distributed database system.

As disclosed herein, "security-protected" may refer to protection that is realized by a cryptographic method, in particular. By way of example, this may be realized by use of the distributed database system for providing or transferring or transmitting corresponding data/transactions. This may be achieved by a combination of the different (e.g., cryptographic) checksums by virtue of the latter interacting synergistically, in particular, in order to improve for example the security or the cryptographic security for the data of the transactions. In other words, "security-protected" may also be understood to mean "cryptographically protected" and/or "manipulation-protected", wherein "manipulation-protected" may also be referred to as "integrity-protected" and/or as "authenticity-protected".

As disclosed herein, "linking (the) data blocks of a distributed database system" may be understood to mean that data blocks each include information (e.g., linking checksum) that refers to or references one other data block or a plurality of other data blocks of the distributed database system.

As disclosed herein, "storing in the distributed database system" or "inserting into the distributed database system" and the like may refer to a transaction or the transactions or a data block with its transactions is/are communicated to one or more nodes of a distributed database system. If these transactions are validated successfully (e.g., by the node(s)), for example, these transactions are linked in particular as a new data block with at least one present data block of the distributed database system. For this purpose, the corresponding transactions are stored in a new data block, for example. In particular, this validating and/or linking may be effected by a trustworthy node (e.g., a mining node, a blockchain oracle, or a blockchain platform). In particular, a blockchain platform may refer to a blockchain as service, as proposed in particular by Microsoft or IBM. In particular, a trustworthy node and/or a node may in each case store a node checksum (e.g., a digital signature) in a data block (e.g., in the data block generated and validated by them, which is then linked) in order in particular to enable an identifiability of the creator of the data block and/or to enable an identifiability of the node. In this case, the node checksum indicates which node has linked for example the corresponding data block with at least one other data block of the distributed database system.

As disclosed herein, "transaction" or "transactions" may refer to a smart contract, a data structure, or a transaction data set that includes in particular in each case one of the transactions or a plurality of transactions. As disclosed herein, "transaction" or "transactions" may refer to the data of a transaction of a data block of a blockchain. A transaction may include a program code that realizes a smart contract. By way of example, transaction may refer to a control transaction and/or confirmation transaction. Alternatively, a transaction may be a data structure that stores data (e.g., the control commands and/or contract data and/or other data such as video data, user data, measurement data, machine learning algorithms, hash values of the algorithms, other variables, etc.).

In particular, "storing transactions in data blocks", "storing transactions" and the like may refer to direct storing or indirect storing. In this case, direct storing may be understood to mean that the corresponding data block (of the distributed database system) or the corresponding transaction (of the distributed database system) includes the respective data. In this case, indirect storing may be understood to mean that the corresponding data block or the corresponding transaction includes a checksum and optionally an additional data set (e.g., a reference or an indication concerning a storage location) for corresponding data and, consequently, the corresponding data are not stored directly in the data block (or the transaction) (e.g., instead only a checksum for these data). In particular, when storing transactions in data blocks, it is possible to validate these checksums, for example, as explained for example under "inserting into the distributed database system".

As disclosed herein, a "program code" (e.g., a smart contract) may refer to one program instruction or a plurality of program instructions, which are stored in particular in one or a plurality of transactions. The program code is executable, in particular, and is executed by the distributed database system, for example. This may be realized by an execution environment (e.g., of a virtual machine), for example, wherein the execution environment and respectively the program code may be Turing complete. The program code may be executed by the infrastructure of the distributed database system. In this case, for example, a virtual machine is realized by the infrastructure of the distributed database system.

As disclosed herein, a "smart contract" may refer to an executable program code (see, in particular, the definition of "program code"). The smart contract may be stored in a transaction of a distributed database system (e.g., a blockchain), for example, in a data block of the distributed database system. By way of example, the smart contract may be executed in the same way as explained in the definition of "program code."

As disclosed herein, "proof-of-work verification" may refer to solving a computationally intensive task which is to be solved in particular depending on the data block content/content of a specific transaction. Such a computationally intensive task may also be referred to as a cryptographic puzzle.

As disclosed herein, a "distributed database system", or a "distributed database", may refer to a decentralized distributed database, a blockchain, a distributed ledger, a distributed storage system, a distributed ledger technology (DLT) based system (DLTS), an audit-proof database system, a cloud, a cloud service, a blockchain in a cloud or a peer-to-peer database. Moreover, it is possible to use, for example, various implementations of a blockchain or a DLTS, such as e.g., a blockchain or a DLTS implemented by a directed acyclic graph (DAG), a cryptographic puzzle, a Hashgraph, or a combination of the implementation variants mentioned. Moreover, various consensus methods (referred to as consensus algorithms) may be implemented, for example. This may be a consensus method by a cryptographic puzzle, gossip about gossip, virtual voting, or a combination of the methods mentioned (e.g., gossip about gossip combined with virtual voting). If a blockchain is used, for example, then this may be implemented by a Bitcoin-based realization or an Ethereum-based realization.

A "distributed database system" may also refer to a distributed database system of which at least some of its nodes and/or devices and/or infrastructure are realized by a cloud. By way of example, the corresponding components are realized as nodes/devices in the cloud (e.g., as a virtual node in a virtual machine). This may be effected for example by VM-Ware, Amazon Web Services or Microsoft Azure, Siemens Mindsphere. On account of the high flexibility of the implementation variants explained, in particular partial aspects of the implementation variants mentioned may also be combined with one another, e.g., by using a Hashgraph as a blockchain, wherein the blockchain itself may e.g., also be blockless.

If, for example, a directed acyclic graph (DAG) is used (e.g., IOTA or Tangle), transactions or blocks or nodes of the graph may be connected to one another via directed edges. This means, in particular, that (e.g., all) edges (e.g., always) have the same direction, in a similar manner to time, for example. In other words, it is not possible, in particular, to move or jump to the transactions or the blocks or the nodes of the graph backwards (that is to say in the opposite direction to the same direction shared). Acyclic here means, in particular, that there are no loops when moving through the graph.

The distributed database system may be a public distributed database system (e.g., a public blockchain) or a closed (or private) distributed database system (e.g., a private blockchain).

If a public distributed database system is involved, for example, this means that new nodes and/or devices may join the distributed database system or be accepted by the latter without authorization verifications or without authentication or without log-on information or without credentials. In particular, the operators of the nodes and/or devices may remain anonymous in such a case.

If the distributed database system is a closed distributed database system, for example, new nodes and/or devices require, for example, a valid authorization verification and/or valid authentication information and/or valid credentials and/or valid log-on information in order to be able to join the distributed database system or in order to be accepted by the latter.

A distributed database system may also be a distributed communication system for data exchange. This may be a network or a peer-to-peer network.

As disclosed herein, "data block", which may also be referred to as "link" or "block" in particular depending on context and realization, may refer to a data block of a distributed database system (e.g., a blockchain or a peer-to-peer database), which in particular is realized as a data structure and may include in each case one of the transactions or a plurality of the transactions. In one implementation, for example, the database (or the database system) may be a DLT based system (DLTS) or a blockchain and a data block may be a block of the blockchain or of the DLTS. A data block may include indications concerning the size (e.g., data size in bytes) of the data block, a data block header, a transaction counter, and one or more transactions. The data block header may include a version, a linking checksum, a data block checksum, a time stamp, a proof-of-work verification, and a nonce (one-off value, random value, or counter used for the proof-of-work verification). A data block may also be only a specific storage area or address area of the entire data stored in the distributed database system. It is thus possible to realize, for example, blockless distributed database systems, such as the IoT chain (ITC), IOTA, and Byteball. In this case, in particular, the functionalities of the blocks of a blockchain and of the transactions are combined with one another in such a way that, e.g., the transactions themselves safeguard the sequence or chain of transactions (of the distributed database system) (that is to say, in particular, are stored in a security-protected manner). For this purpose, with a linking checksum, for example, the transactions themselves may be linked with one another, e.g., by a separate checksum or the transaction checksum of one or more transactions serving as linking checksum, which is concomitantly stored in the corresponding new transaction when a new transaction is stored in the distributed database system. In such an embodiment, a data block may also include one or more transactions, wherein in the simplest case for example a data block corresponds to a transaction.

As disclosed herein, "nonce" may refer to a cryptographic nonce (e.g., abbreviation of: "used only once" or "number used once"). In particular, a nonce denotes an individual combination of numbers or letters that may be used once in the respective context (e.g., transaction, data transfer).

As disclosed herein, "data blocks preceding a (specific) data block of the distributed database system" may be understood to mean that data block of the distributed database system which directly precedes in particular a (specific) data block. Alternatively, "data blocks preceding a (specific) data block of the distributed database system" may also refer to all data blocks of the distributed database system which precede the specific data block. As a result, by way of example, the linking checksum or the transaction checksum may be formed in particular only over the data block (or the transactions thereof) directly preceding the specific data block or over all data blocks (or the transactions thereof) preceding the first data block.

As disclosed herein, a "blockchain node", "node", "node of a distributed database system" and the like may refer to devices (e.g., field devices, cellular phones), computers, smartphones, clients, or subscribers that carry out operations with the distributed database system (e.g., a blockchain). Such nodes may execute transactions of a distributed database system or the data blocks thereof or introduce or link new data blocks with new transactions into the distributed database system by new data blocks. In particular, this validating and/or linking may be effected by a trustworthy node (e.g., a mining node) or exclusively by trustworthy nodes. A trustworthy node may refer to a node that has additional security measures (e.g., firewalls, access restrictions to the node, or the like) in order to prevent a manipulation of the node. Alternatively, or additionally, by way of example, during the linking of a new data block with the distributed database system, a trustworthy node may store a node checksum (e.g., a digital signature or a certificate) in the new data block. A verification may thus be provided, in particular, which indicates that the corresponding data block was inserted by a specific node or indicates its origin. The devices (e.g., the corresponding device) may be devices of a technical system and/or an industrial installation and/or an automation network and/or a manufacturing installation which in particular are also a node of the distributed database system. In this case, the devices may be field devices or devices in the Internet of Things which in particular are also a node of the distributed database system. Nodes may also include at least one processor in order to carry out, e.g., their computer-implemented functionality.

As disclosed herein, a "blockchain oracle" and the like may refer to nodes, devices or computers that have, e.g., a security module including, for example, software protection mechanisms (e.g., cryptographic methods), mechanical protection devices (e.g., a lockable housing), or electrical protection devices (e.g., tamper protection or a protection system that erases the data of the security module in the event of impermissible use/handling of the blockchain oracle). In this case, the security module may include cryptographic keys, for example, which are necessary for calculating the checksums (e.g., transaction checksums or node checksums).

As disclosed herein, a "computer" or a "device" may refer to a computer (system), a client, a smartphone, a device or a server, each of which is arranged outside the blockchain or is not a subscriber of the distributed database system (e.g., of the blockchain) (that is to say does not carry out operations with the distributed database system or only interrogates the latter, but without carrying out transactions, inserts data blocks or calculates proof-of-work verifications). Alternatively, a computer may refer to a node of the distributed database system. In other words, a device may refer to a node of the distributed database system or else a device outside the blockchain or the distributed database system. A device outside the distributed database system may access the data (e.g., transactions or control transactions) of the distributed database system and/or be driven by nodes (e.g., by a smart contract and/or blockchain oracle). If, for example, driving or control of a device (e.g., a device embodied as a node or a device outside the distributed database system) is realized by a node, this may be effected by a smart contract stored in a transaction of the distributed database system.

The features set out above and features described below may be used not only in the corresponding combinations explicitly set out, but also in further combinations or in isolation, without departing from the scope of protection of the present disclosure.

DETAILED DESCRIPTION OF EMBODIMENTS

The above-described properties, features, and advantages of this disclosure and the way in which they are achieved will become clearer and more clearly understood in association with the following description of the exemplary embodiments which are explained in greater detail in association with the drawings.

The present disclosure is explained in greater detail below based on the exemplary embodiments with reference to the drawings. In the figures, identical reference signs designate identical or similar elements. The figures are schematic representations of various embodiments of the disclosure. Elements illustrated in the figures are not necessarily illustrated in a manner true to scale. Rather, the various elements illustrated in the figures are rendered in such a way that their function and general purpose become comprehensible to the person skilled in the art. Connections and couplings between functional units and elements that are illustrated in the figures may also be implemented as indirect connection or coupling. A connection or coupling may be implemented in a wired or wireless fashion. Functional units may be implemented as hardware, software or a combination of hardware and software.

Techniques in association with intrusion detection for a computer system are described below. The computer system may be for example an individual computer or a network including a plurality of computers.

The intrusion detection is implemented on an IDS. The IDS may be arranged in a manner separated from the computer system spatially and functionally. That means that the IDS and the computer system may use different operating systems or operating system entities. The IDS and the computer system may be arranged in different rooms or locations or countries.

In some examples, the IDS and the computer system may alternatively be co-implemented. One exemplary implementation would be manifested as follows: the computer system runs in the normal mode. The IDS runs in a safeguarded environment on the same device. Inter alia, the safeguarded environment may be a trusted execution environment (see e.g., the TEE/Trust Zone from ARM). Because the trusted execution environment is separated from the normal operating system by physical CPU-internal measures, that may be an alternative type of implementation with high security.

The intrusion detection techniques described herein use an analysis of log messages of the computer system. Such log messages may be indicative of the current system behavior of the computer system. For example, the log messages may be indicative of one or more of the following elements: system calls, data access, network packets, communication protocols, user login, failed calls, active network connections, etc.

The analysis may use a signature-based attack detection, e.g., may compare the current system behavior with an attack pattern stored in a database. Alternatively, or additionally, it would also be possible for the analysis to use statistical methods or algorithms of machine learning, for instance, in order to detect anomalies. Other algorithms may be used as well, for instance, anomaly detection.

The techniques described herein make possible an unconventional and novel technique in association with intrusion detection. In particular, the techniques described herein make it possible to enable particularly secure and efficient intrusion detection by way of the interplay of a plurality of different devices. In particular, the use of a plurality of devices makes it possible to avoid the use of a single central authority. This will be explained in even greater detail below.

In a reference implementation, the log messages are analyzed on a central entity operated in a secure environment with enhanced security measures. Problems of such a central entity in accordance with a reference implementation include the following. First, for the entire ecosystem, the central entity is regarded as a central security node and may thus constitute a "single point of failure". Therefore, not only is it necessary for the system to maintain integrity at the execution time, but it is also necessary to safeguard the integrity of earlier analyses. That makes the central analysis entity complex, costly, and it is a single point of failure. Second, because a central entity may carry out the analysis for a plurality of clients, such a system has to provide a very high up-time by redundancy mechanisms. That likewise makes the central analysis entity complex and costly. Third, such systems may be complex because a plurality of clients have to be served in parallel (e.g., remote attestation for multiple devices, high parallelization).

In order to enable simplified and particularly secure intrusion detection by comparison with such a reference implementation, a distributed database is used in accordance with various examples. In some examples, the distributed database may be implemented as a blockchain in a blockchain infrastructure. While examples are described in multiple instances below in association with an implementation on the basis of a blockchain, a different type of distributed database may also be used in other examples.

In various examples, so-called smart contracts are used. The smart contracts may be stored in the distributed database and include executable program code. Specific conditions may be taken into account in the execution of the program code and, for example, a result of the smart contract may be dependent on one or a plurality of such conditions.

In accordance with various examples, particularly small smart contracts may be used. That is to say that the logic represented in the smart contracts may be greatly limited in comparison with other implementations. As a result, the costs of the smart contracts, (e.g., to be paid to an operator of the blockchain infrastructure or an operator of a node of the blockchain infrastructure), may be particularly low and/or else the costs for implementing the smart contracts may be particularly low on account of the reduced size.

In various examples, log messages from a computer system to be monitored may be analyzed in a decentralized manner depending on a result of the implementation of a smart contract. The results of this analysis may in turn be stored in the blockchain. For example, the IDS to be used may be selected from a plurality of candidate IDSs depending on the result of the implementation of the smart contract. The log messages may be received directly from the computer system at the IDS via an end-to-end channel; that means that the "payload" (e.g., the log messages) need not be handled via the blockchain. This enables the logic implemented by the blockchain to be kept lean and efficient. One or more parameters of the end-to-end channel may however be exchanged between the IDS and the computer system with the involvement of the blockchain, e.g., registration information that is indicative of an identification of the IDS.

Figure 1:
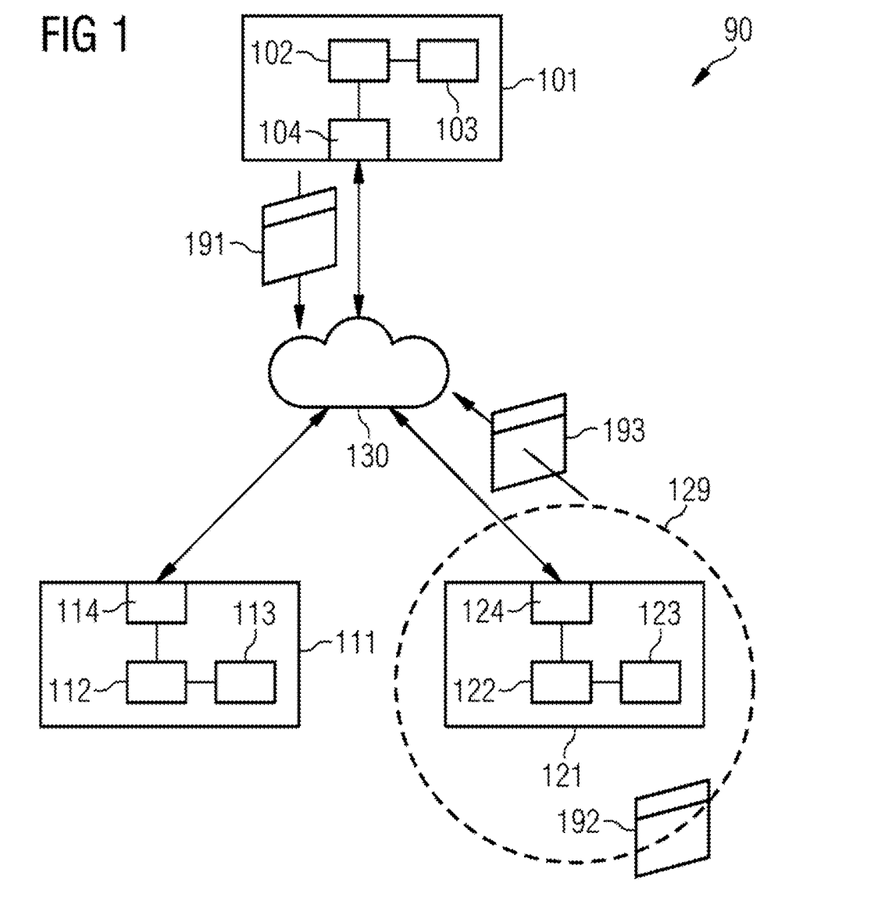
FIG. 1 illustrates a system including a computer system, a blockchain infrastructure and an IDS in accordance with various examples.

FIG. 1 illustrates a system 90 that may be used in association with the various intrusion detection techniques described herein.

The system 90 includes a computer system 101, implemented by an individual computer in the example in FIG. 1. The computer system 101 includes a processor 102, a memory 103 and a communication interface 104. The processor 102 may load program code from the memory 103 and execute it. This has the effect that the processor carries out various techniques in association with the intrusion detection described herein: for example receiving, verifying, or implementing information or data via the communication interface 104, creating log messages, transferring log messages 191 via the communication interface 104, etc.

The computer system 101 is connected to further devices via a communication network 130, (e.g., the Internet or a local network). In the example in FIG. 1, an IDS 111 is also provided. The IDS 111 is configured to carry out intrusion detection for the computer system 101 on the basis of log messages 191 that are transmitted by the computer system 101 and received at the IDS 111.

For this purpose, the IDS 111 includes a processor 112, a memory 113, and a communication interface 114. The processor 112 is connected to the network 130 via the communication interface 114. The processor 112 may in turn load program code from the memory 113 and execute the program code. Executing the program code has the effect that the processor 112 implements various techniques in association with the intrusion detection as described herein, for example: communicating with a node 121 of an infrastructure 129 of a distributed database via the communication interface 114; obtaining a command for intrusion detection, (e.g., by look-up in the blockchain and/or by applying to store registration information); carrying out the intrusion detection for the computer system 101 on the basis of an analysis of the log messages 191; receiving and/or transmitting information or data via the communication interface 114; etc.

The system 90 also includes the infrastructure 129 of the distributed database, such as a blockchain infrastructure 129 in the example in FIG. 1. The blockchain infrastructure 129 includes a multiplicity of nodes, one node 121 in particular being illustrated in the example in FIG. 1. The various nodes may also be referred to as mining nodes and may be configured according to the node 121 in accordance with FIG. 1.

The mining node 121 in the example in FIG. 1 includes a processor 122, a memory 123, and a communication interface 124. The processor 122 is in turn connected to the network 130 via the communication interface 124. The processor 122 may load program code from the memory 123 and execute the program code. When the processor 122 executes the loaded program code, this has the effect that the processor 122 implements various techniques in association with the intrusion detection as described herein, for example: implementing a smart contract 192 stored in the blockchain; selecting from a multiplicity of IDSs, (e.g., selecting the IDS 111 depending on a result of the implementation of the smart contract 192); granting an authorization 193 for the selected IDS, (e.g., the IDS 111), in order to initiate the intrusion detection; and storing registration information of the selected IDS depending on an application of the analysis device in order to grant the authorization in this way.

The mining node 121 may be a subscriber of the blockchain infrastructure 129 which may implement smart contracts 192 and may attempt to store the result of the implementation of the smart contract 192 in the blockchain. In some examples, mining nodes 121 may be paid for implementing smart contracts, wherein this payment may be conditional if the mining nodes manage to generate a block in the blockchain which is indicative of the result of the implementation of the smart contract. In order to generate this block in the blockchain, the mining nodes 121 may have to solve a consensus algorithm or a cryptographic puzzle (for example, proof-of-work or proof-of-stake or some other customary consensus algorithm); however, this is not always necessary.

Various concepts which have already been mentioned above in association with FIG. 1 are explained in greater detail below. The descriptions given below may serve as definitions in some examples. Different implementations may also be used in other examples.

Smart contracts 192 are programs which are written to the blockchain and define a contract. In this case, smart contracts 192 are programs which are executed by mining nodes 121 and are paid for the execution. Examples of smart contracts are: "if the sum x arrives from the address y, performs z." or "if the sum y>2*x arrives from address z, transmit 2*x to v." One example of smart contracts 192 is so-called MultiSig contracts. MultiSig contracts are smart contracts 192 which may only be implemented if a plurality of nodes of the blockchain infrastructure 129 endorse the validity of a contract (e.g., a smart contract) and thus the implementation thereof.

Gas & gas price (analogously gasoline) is a medium which is required in order to be able to effect computation operations in the blockchain infrastructure 129. The more computationally intensive a smart contract 192, the more gas is required. The gas price indicates how much is willing to be paid to the mining nodes 121 for a computation operation, for instance, solving a cryptographic puzzle (e.g., proof-of-work or proof-of-stake) and/or the complexity of the smart contract to be implemented. The greater the amount willing to be paid, the greater the probability of the smart contract 192 being implemented.

In the context of a blockchain infrastructure 129, oracles are a kind of agent that verifies events from the real world and provides them for the smart contracts 192. An oracle may also be used as a trustworthy third party. For example, it would be possible for an oracle to receive log messages 191 from the computer system 101. For example, the oracle may forward the log messages to one or more IDSs 111, e.g., if the latter are selected and authenticated to carry out the intrusion detection.

Alarm clocks: in some implementations, smart contracts 192 cannot implement themselves after a period has elapsed. In order to initiate the implementation of a smart contract 192, so-called alarm clocks exist. Alarm clocks are special nodes of the blockchain infrastructure which pay mining nodes 121 for implementing specific smart contracts 192.

Computer system 101: the log messages 191 of this device are analyzed.

IDS 111 is responsible for analyzing log messages 191 of the computer system 101. In some examples, a multiplicity of IDSs may be present, and from these one or a plurality of IDSs 111 are appointed to carry out the intrusion detection.

The functioning of the system 90 in association with the intrusion detection is explained in greater detail below with reference to the flow diagrams in accordance with FIG. 2, FIG. 3, and FIG. 4.

Figure 2:
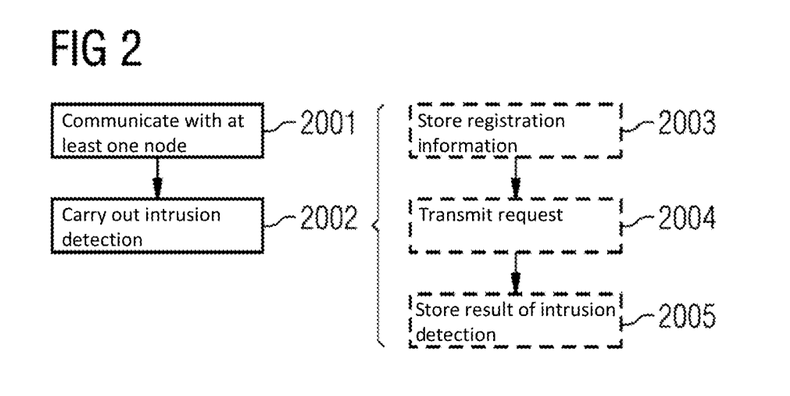
FIG. 2 is a flow diagram of one exemplary method.

FIG. 2 is a flow diagram of one exemplary method. For example, the method in accordance with FIG. 2 may be carried out by an IDS, for example, by the IDS 111 of the system 90 in the example in FIG. 1. In particular, the method in accordance with FIG. 2 may be performed by the processor 112 on the basis of program code loaded from the memory 113.

Block 2001 involves carrying out the communication with at least one node of an infrastructure of a distributed database, for example, with the mining node 121 of the blockchain infrastructure 129 in the example in FIG. 1. This communication is effected in order to obtain an authorization for intrusion detection for a computer system, e.g., the computer system 101 (cf. authorization 193 in FIG. 1).

In one example, the authorization may be based on a result value of a smart contract implemented by the node.

Sometimes a two-stage process may be carried out for the authorization: (i) if the result value is compatible with registration information of the IDS 111, then the IDS may be preauthorized; (ii) the IDS may then apply to be finally authorized, namely by transmitting the registration information to the blockchain infrastructure, for the purpose of storing the registration information in the blockchain. If this application is successful, then the registration information is stored in the blockchain, and the IDS 111 is finally authorized. This means, therefore, that the IDS 111 may actively check whether it obtains the authorization to carry out the intrusion detection. In such a variant, the mining node 121 stores the IDSs 111 preselected for the intrusion detection in the blockchain. The IDSs 111 then check in the blockchain—by accessing a corresponding memory of the blockchain infrastructure, that is to say that look-up in the blockchain is effected—whether they have been selected. In some examples, a final application for the appointment to carry out the intrusion detection may subsequently be effected as well.

In another example, the authorization may alternatively be received as a command from the mining node. In that case, the IDS 111 may thus passively accept the authorization.

If the authorization is obtained in block 2001, then block 2002 involves carrying out the intrusion detection. In some examples, this may be based on an analysis of log messages of the computer system (cf. log messages 191 in FIG. 1). For this purpose, the log messages may be received from the computer system via a communication interface. This may be effected, as will be described in greater detail below, for example, as a reaction to a corresponding request (cf. block 2004).

The analysis in block 2002 may be based on at least one machine-learned algorithm.

For example, it would be possible for a specific algorithm, (e.g., a specific machine-learned algorithm), to be selected from a multiplicity of possible candidate algorithms. This selection may be effected on the basis of a corresponding entry in the blockchain of the blockchain infrastructure 129. For example, a corresponding configuration may be notified by way of the authorization 193. Furthermore, there is the possibility of the operator of the computer systems 101, the IDS 111, oracles, the machine-learned algorithms, the smart contract, etc., upon the start of the blockchain-based log message analysis, anchoring the necessary parameters for the correct operation of the overall system in the blockchain fixedly by way of a mining node, oracles, etc. Another implementation variant of bootstrapping might be, upon initial starting of the blockchain, fixedly anchoring the necessary parameters in the blockchain.

Furthermore, the parameters during bootstrapping may also be only in the form of a pointer to an external storage unit. Any parameters allowing the overall system to be operated may be stored in the external storage unit. By way of example, the following parameters may be transferred to the blockchain upon the initial start: trustworthy oracles, approved IDSs 111, approved computer systems 101, etc. Such a configuration is sometimes also referred to as bootstrapping.

In such an implementation, it is thus possible to operate an IDS, but there is no need to use a central authority. Rather, the intrusion detection is carried out dynamically depending on the authorization. The authorization may be granted selectively to one or a plurality of IDSs which are selected dynamically. This increases security because, in different entities, for example, different IDSs may be entrusted with the intrusion detection and in this way it becomes more difficult for an attacker to carry out corruption of the IDS. By virtue of the authorization being obtained from a mining node, for example, as a result value of a smart contract implemented by the mining node, the distribution of the authorizations may also be embodied in an attack-proof manner.

Details concerning block 2002 are described below. Block 2002 may include blocks 2003, 2004, and 2005, for example. These blocks 2003 to 2005 may be optional.

In this regard, for example, block 2003 involves carrying out an application for storing registration information. The registration information may be indicative of the identity of the IDS. For example, the registration information may include a unique identifier, e.g., a MAC address, a hardware code, a cryptographic key, etc. The registration information is stored in the blockchain, e.g., may be provided to the blockchain infrastructure. For example, the registration information may be provided to the mining node from which the authorization was obtained previously. The mining node may then write the registration information, e.g., to the smart contract that was implemented previously in order to implement the authorization for intrusion detection. For this purpose, the mining node may implement the smart contract and then solve a cryptographic puzzle in order to store the corresponding data in the blockchain.

In optional block 2004, a request is then transmitted to the computer system 101 to be monitored. The request concerns the carrying out of the intrusion detection and is indicative of the registration information. If the application in block 2003 was successful, the registration information is stored in the blockchain. The transmission of the request, which is indicative of the registration information, enables the computer system 101 to compare the request with the registration information stored in the blockchain in order to verify the authorization of the IDS 111. The security vis-à-vis manipulation is thus increased as a result.

The request may include at least one from a public cryptographic key material and a certification of the IDS 111 in association with the registration information. In this way, it is possible to achieve particularly high security in the communication between the IDS 111 and the computer system 101.

In block 2005, the result of the intrusion detection is stored in the blockchain. For this purpose, a result value of the analysis of the log messages may be transmitted, e.g., to the mining node from which the authorization was obtained in block 2001, and/or a result value may be transmitted to the oracle and/or a further third entity (administrator, operator, etc.). However, this is only one exemplary implementation. There would also be the possibility of implementing a corresponding function of the smart contract. Different mining nodes 121 of the blockchain infrastructure 129 may thus be afforded the possibility of storing a corresponding variable in a block of the blockchain.

Figure 3:
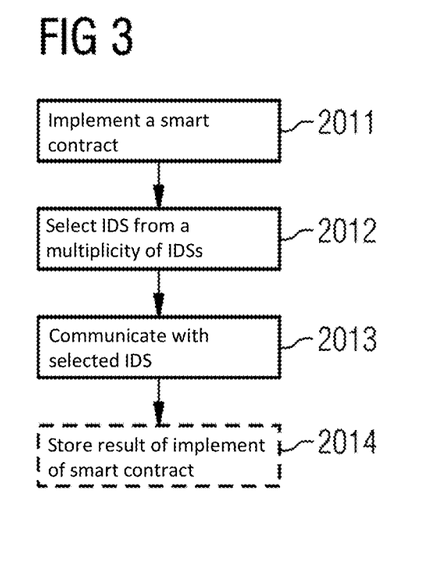
FIG. 3 is a flow diagram of one exemplary method.

FIG. 3 is a flow diagram of one exemplary method. For example, the flow diagram in accordance with FIG. 3 may be implemented on a node of an infrastructure of a distributed database, for example on a mining node such as the mining node 121 of the blockchain infrastructure 129 in accordance with the example in FIG. 1. The example in FIG. 3 is described below for an implementation in association with the mining node 121. In another example, it would be possible for the method in accordance with FIG. 3 to be performed by a different node.

Block 2011 involves implementing a smart contract (cf. FIG. 1, smart contract 192). For example, the smart contract may be implemented if a timer event occurs and/or if an external request is obtained, for example, from an alarm clock and/or as a reaction to an operation-related event at the computer system 101.

An example concerning the operation-related event at the computer system 101 is given below: it is assumed that the computer system 101 is a field device in a production environment (e.g., a robot arm). If a new job is now transmitted to the robot arm in order to create a specific product, this new job here may be regarded as an initiating event for implementing the smart contract. If such an initiating event occurs, the integrity or the log messages of the robot arm may be checked. For this purpose, it is not absolutely necessary to run through the protocol completely. Sometimes it is sufficient to address the IDSs 111 which were selected (see variable 215 in block 203) and to send the respective log messages to the IDS 111 via the channel 302. The robot arm may begin with production and it is only at a later time that the operator of the production installation, by monitoring the variable 216 in block 204, may verify whether the robot arm has not been manipulated, and the product may thus be sold. This may be referred to as an external trigger.

It would be possible for implementing the smart contract in block 2011 to include at least one from a random component, a time-variable component, a situation-variable component, and an authentication on the basis of the blockchain. This means that depending on the situation and/or time or alternatively randomly in each case a different result is obtained in the context of implementing the smart contract.

What may be achieved thereby is that the result of implementing the smart contract cannot be foreseen or may be foreseen only with difficulty by an attacker or implementing the smart contract cannot be manipulated or may be manipulated only with particular difficulty by an attacker.

Then, in block 2012, one IDS is selected from a multiplicity of IDSs, specifically depending on a result of implementing the smart contract 192. For example, a first subset of IDSs (including the IDS 111) may be selected from a multiplicity of potential candidate IDSs. This means that a different subset may be selected depending on the result of implementing the smart contract. A corresponding result value may be crucial for this selection.

Block 2013 then involves communicating with the selected IDS 111 in order to grant the authorization 193 for carrying out the intrusion detection. This is based on the selection from block 2012.

This granting of the authorization may be effected in response to an application by the IDS 111 or, for example, by at least some of the multiplicity of candidate IDSs. The application may be effected by those IDSs of the multiplicity of candidate IDSs which were preselected by a result value of the implementation of the smart contract; that corresponds to a first selection stage. In a second selection stage, the preselected candidate IDSs may then provide an application that includes the registration information thereof. The mining node 121 may attempt to then store this registration information in the blockchain. If this is successful, (e.g., if the application is successful), then the respective IDS is authorized.

In some examples, it may be desirable, in block 2012, to prevent a situation in which an IDS pays a very high gas price and is thus prioritized by all the mining nodes, e.g., the respective registration information is stored in a prioritized manner. In order to achieve this, the gas price may be predefined from the outset by way of the smart contract 192. A certain price window may also be predefined. If the gas price is not lucrative for the mining nodes, this price window or the predefined (fixed) price ought to be increased simultaneously for all of them. The price increase may take place by way of the oracle or by way of the IDSs 111 or by way of some other mechanism.

In optional block 2014, the result of implementing the smart contract is stored in the blockchain. Alternatively or additionally, the identification of the computer system 101 for which the intrusion detection is commanded may also be stored in the blockchain. Alternatively or additionally, an identification of the selected IDS 111 may also be stored in the blockchain. An auditability of the process may be made possible in this way.

Figure 4:
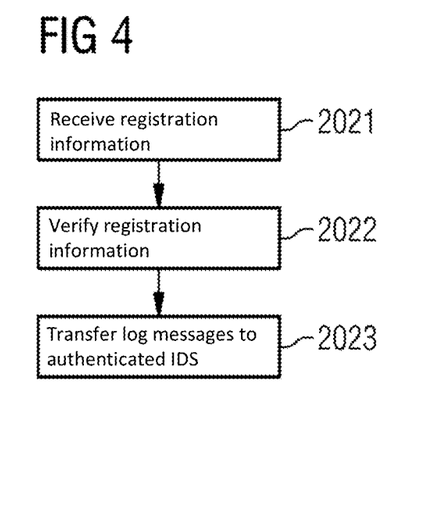
FIG. 4 is a flow diagram of one exemplary method.

FIG. 4 is a flow diagram of one exemplary method. For example, the method in accordance with FIG. 4 may be performed by a computer system for which intrusion detection is intended to be carried out. For example, the method in accordance with FIG. 4 may be performed by the computer system 101 of the system 90 in accordance with the example in FIG. 1. Examples are described below in association with the execution of the method in accordance with FIG. 4 being performed by the computer system 101, although corresponding examples may alternatively also be implemented by other computer systems.

For example, the method in accordance with FIG. 4 may be performed by the processor 102 of the computer system 101, on the basis of program code loaded from the memory 103.

In block 2021, registration information is received from the IDS 111. The IDS 111 was appointed to carry out the intrusion detection. In this respect, block 2021 corresponds to block 2004 in accordance with FIG. 2. The registration information is indicative of the identity of the IDS.

In block 2022, a verification of the registration information is then initiated. As a general rule there are a number of possibilities for implementing the verification. For example, the verification may be effected by comparison with information stored in the blockchain. The computer system 101 may accordingly look up in the blockchain. However, it would also be possible for the verification to be implemented as functionality of the blockchain, for instance, the smart contract 192. The computer system 101 may then initiate the verification by a corresponding request. In a further variant, it would be possible to use a public-key infrastructure for verification.

The verification makes it possible to provide that an authorized request for log messages is present.

If the verification in block 2022 was successful, (e.g., a positive result is obtained), then in block 2023 log messages 191 are transferred to the now authenticated IDS 111, such that the latter may carry out the intrusion detection. The transfer of the log messages 191 may also be delayed until, e.g., a specific operation-related event occurs at the computer system 101. Alternatively, or optionally, the log messages 191 may also be transferred to the oracle until the IDS is ready to retrieve these log messages 191.

As a general rule the transfer may be effected directly or via a proxy, e.g., the oracle.

Figure 5:
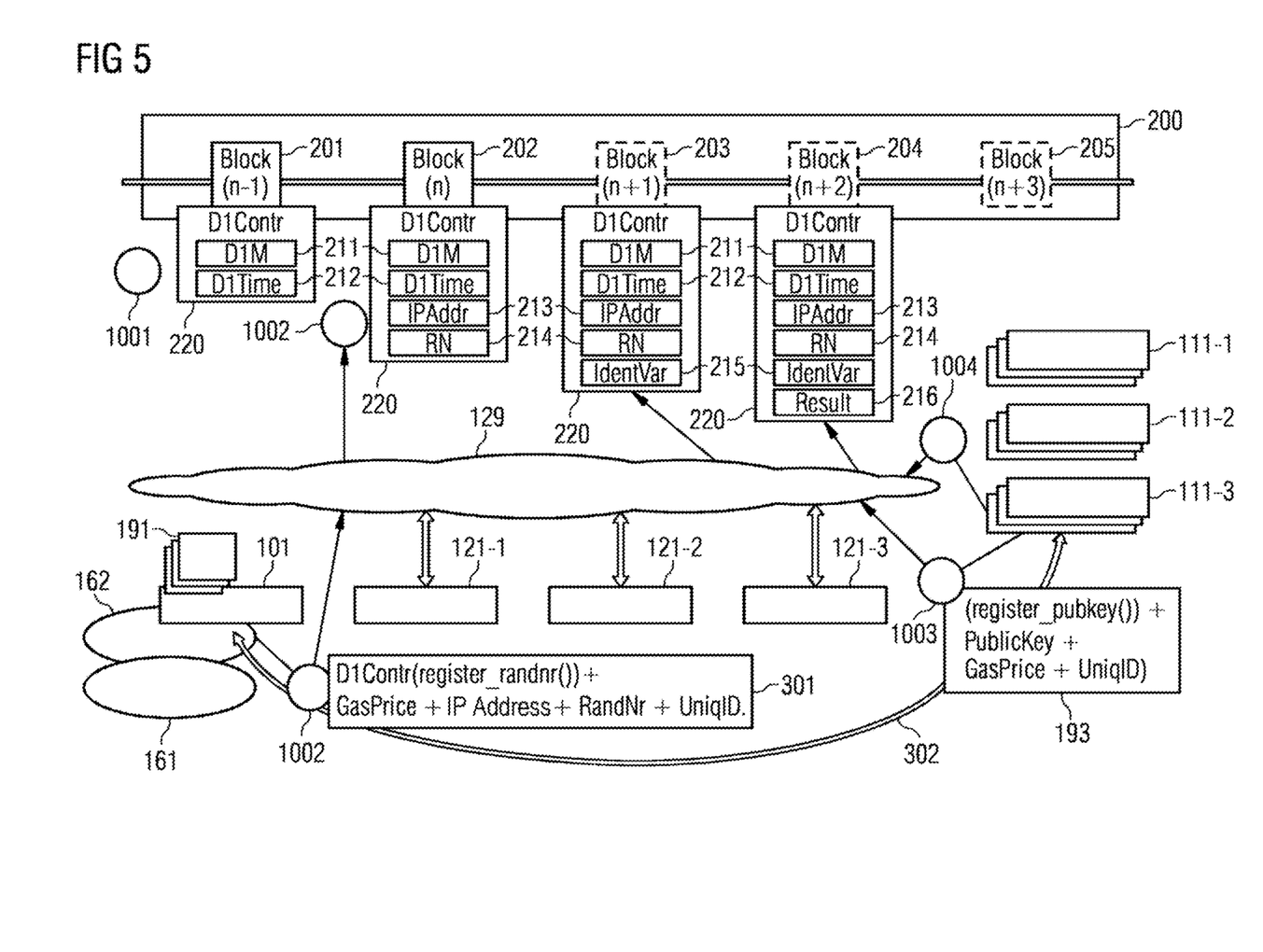
FIG. 5 schematically illustrates the functioning of the IDS in accordance with various examples.

In order to implement block 2022, the IDS 111 may log on at the computer system 101 (cf. 302 in FIG. 5).

FIG. 5 illustrates aspects in association with an exemplary implementation of the techniques for intrusion detection in accordance with various examples. FIG. 5 may describe the examples described above in association with FIGS. 2 to 4.

The example in FIG. 5 uses the system 90. FIG. 5 illustrates a blockchain 200 as a distributed database that is implemented on the infrastructure 129. In FIG. 5, a plurality of IDSs 111-1-111-3 are present. In addition, a plurality of mining nodes 121-1-121-3 are present.

The blockchain 200 includes linked blocks 201-205.

The blockchain 200 stores, inter alia, smart contracts 220 (designated by D1Contr in FIG. 5) for the IDS 111. The smart contracts 220 are used for analyzing the log messages 191 of the computer system 111 by a decentralized mechanism. One exemplary implementation concerns the smart contract 192.

It is assumed in the example in FIG. 5 that the technique for analyzing log messages, (e.g., a corresponding algorithm), had already been stored in the blockchain 200 of the blockchain infrastructure 129, specifically in association with the smart contract (cf. block 201). For example, a corresponding machine-learned algorithm (designated by D1M in FIG. 5) may be stored by way of a corresponding variable 211 in the blockchain 200. The variable may include the machine-learned algorithm itself or implement a pointer thereto.

The exchange of the log messages 191 is made possible by an end-to-end secure channel 302. The authorization authorizing IDSs 111-1-111-3 to carry out the analysis of the log messages 191 for intrusion detection is negotiated by way of the smart contracts 220 and mining nodes 121-1-121-3 and IDSs 111-1-111-3. This functioning is explained in greater detail below.

First, reference is made to act 1001. The smart contract 220 D1contr is stored in the blockchain 200 and is implemented periodically after a certain time has elapsed (e.g., every 10 minutes or once every day). This time is also referred to as an activation interval and is stored as variable 212 D1Time in the smart contract 220. In addition, D1Time provides information about how long the smart contract 220 is valid. An external initiating event would also be conceivable. Furthermore, the machine-learned algorithm or a hash value of the machine-learned algorithm is stored in the variable 211 D1M. The algorithm for the analysis of the log messages 191 may thus be selected on the basis of the entry in the variable 211 D1M in the blockchain 200.

The smart contract 220 may be specific to the computer system 101. A different smart contract may be used for a different computer system.

In act 1002, if the time determined by the variable 212 has elapsed, the smart contract 220 D1Contr will be implemented. For this purpose, the alarm clock 162 sends to all the mining nodes 121-1-121-3 a job 301 for implementing the function register_randnr( ) of the smart contract 220 D1Contr and for storing the result of the function register_randnr( ) in the blockchain 200. In addition, the alarm clock sends as input parameters regarding the function register_randnr( ) the values: gas price+IP address+D1Contr+RandN+UniqID.

The unique identifier UniqID is a value which provides information about what is/are the last block/blocks in the blockchain 200. This may involve a hash value or an inherent mechanism of the blockchain 200 for carrying out this identification.

RandN is a random value that provides information about which IDSs 111-1-111-3 may store their public key/their certificate in the blockchain 200 in order to carry out the analysis in the further course of the procedure.

A few exemplary implementations are described below in association with acts 1001 and 1002, respectively.

The implementation of the smart contract 220 D1Contr may either be instigated by an alarm clock, the smart contract 220 or the oracle or the smart contract 220 implement itself. That means that a timer event or an external trigger or an external request may assess the implementation of the smart contract 220.

The gas price indicates how much the alarm clock is willing to pay for the processing of the smart contract 220. If the gas price was too low, it might be the case, under certain circumstances, that the smart contract 220 or register_randnr( ) has not been implemented by the mining nodes 121-1-121-3 and the mining nodes 121-1-121-3 have processed other, even more lucrative smart contracts. Therefore, the possibility exists of increasing the gas price piecewise, in a manner similar to that in the case of an auction, until the smart contract has been successfully implemented and the result of register_randnr( ) has been stored in the blockchain 200 (supply-demand pricing). That means that a predefined gas price, (e.g., a price window), may prevent certain IDSs from offering a much too high gas price and thus immediately being selected as IDSs by the mining nodes. The gas price increase may also be regulated and transparent to all IDS analysis nodes, such that no security gaps arise here for attackers.

The IP address points to the address of the computer system 101. The IP address may also be that of a proxy server. A proxy server might be necessary if the computer system 101 is operated behind a firewall. The IP address is stored, likewise by the function register_randnr ( ) in the variable IPAddr in D1Contr. The variable IPAddr may also be a pointer to a further storage location. The further storage location may include the actual information for establishing the communication with the computer system 101 (e.g., IP address with further additional information necessary for successful communication).

RandN is a random value and may be generated as follows by the devices in (I):

$$RandN = \text{hash}(\text{random number} | \text{current time of day} + \text{date})$$

or $$RandN = \text{hash}(\text{current block number}).$$

UniqID is a hash value that is generated by way of the last n blocks 201-205 in the blockchain 200 (e.g., let x=3: UniqID=hash(block$_{n-2}$|block$_{n-1}$|block$_n$)).

The function register_randnr( ) of the smart contract 220 D1Contr performs the following calculation: RN=hash (RandN|UniqID). The implementation of the smart contract 220 is thus based on the random component RandN. If the blockchain infrastructure 129 and/or the smart contract 192 and/or the alarm clock 162 and/or the oracle 161 do(es) not support a random value RandN, then just RN=hash(UniqID) may also be used.

All mining nodes 121-1-121-3 that find the job from the alarm clock 162 interesting implement the function register_randnr( ). The mining nodes 121-1-121-3 subsequently attempt to create a new valid block 202 for the blockchain 200 by virtue of their attempting to solve a cryptographic puzzle (e.g., proof-of-work, proof-of-stake). The mining node 121-1-121-3, which is the first one that manages to solve the puzzle creates the new block 202, stores this block 202 with the value RN in the smart contract 220 D1Contr and obtains a payment. In this block 202, besides the value RN, the IP address of the computer system 101 is also stored under the variable 213 IPAddr. In this case, the implementation of the variable 213 as an IP address is optional, however. Alternatively, or additionally, one or more other values may also be used to establish the connection to the computer system 101, (e.g., if a firewall is used). If the computer system 101 lies behind a firewall, further parameters may also be added in order to be able to route the packets through the firewall. Alternatively, the communication takes place via a proxy. This means that fewer parameters are required because the proxy deals with the routing and the firewall problem.

Sometimes smart contracts do not afford the possibility of mining nodes 121-1-121-3 generating a random number and storing the latter in the blockchain 200. Therefore, in the example described, the random number generation was shifted to be the responsibility of the alarm clock 162/oracle 161 (e.g., the value RandN). In other smart contracts 222, however, it might be possible for mining nodes 121-1-121-3 to generate a random value (e.g., RandN or the like) and to store the latter in the variable 214 RN in the smart contract 220. This is an interesting approach because it is not deterministic in respect of which mining node 121-1-121-3 generates a new block and, therefore, the random number which is finally stored in the blockchain 200 would thus also be selected randomly by a node.

Because it is not certain whether the mining nodes 121-1-121-3 will be successful, it may sometimes be desirable to establish security against replay attacks. In order to prevent replay attacks, the UniqID is also used as an input parameter for the function register_randnr( ). That means that implementing the function register_randnr( ) requires an authentication by the UniqID; the UniqID is, as described above, a value which provides information about what is/are the last block/blocks in the blockchain 200. That means, therefore, that implementing the smart contract also depends on an authentication on the basis of the blockchain 200. For example, a manipulation of the blockchain may be detected in this way. Alternatively and/or additionally, replay attacks may be prevented or detected in this way.

In act 1003, it is assumed that the gas price was lucrative and that ⅔ of all the mining nodes 121-1-121-3 have accepted the job. The result, e.g., the variable 214 RN of the function register_randnr( ) and the IP address as variable 213 IPAddr, is stored in the block 202. Because implementing the smart contract 220 is also effected depending on the random number RandN (e.g., the smart contract 220 includes a random component), the value of the variable 214 RN is chosen randomly and provides information about which IDSs 111-1-111-3 are invited with a corresponding authorization 193 to carry out the analysis.

The value of the variable 214 RN is thus chosen randomly and provides information about which IDSs 111-1-111-3 are invited to submit an application for carrying out the intrusion detection. That means that the value of the variable 214 RN thus corresponds to a preselection of IDSs 111-1-111-3, in the context of the authorization. This preselection may be realized as follows:

In a first example, all IDSs 111-1-111-3 whose last 8 bits of the public key correspond to the last 8 bits of the variable 214 RN are authorized to be able to register themselves in the blockchain 200 under the variable 215 IdentVar.

In a second example, the function modulo$_{256}$(RN) and modulo$_{256}$(PublicKey) results with a value having a size of 8 bits. All IDSs 111-1-111-3 for which the values correspond are authorized to be able to register themselves in the blockchain 200 under the variable 215 IdentVar.

There exist numerous further examples for implementing this selection mechanism, e.g., checksum over RN and certificate.

It is evident from the above that the variable RN 214 may apply to a multiplicity of preselected IDSs 111. Sometimes, however, just a single IDS or a specific number of IDSs is/are required in order to carry out the intrusion detection. For this reason, sometimes only a portion of the IDSs that satisfy the selection condition determined on the basis of RN is selected. The preselected IDSs are then stored in the blockchain 200 under the variable 215 IdentVar. For this reason, in some examples, it may be desirable for the IDSs also to participate in the negotiation for creating the variable 215 IdentVar. This may include an application for storing registration information. If the registration information is actually stored in the blockchain 200, the authorization is concluded.

It is assumed as an example that 3 IDSs are sought for the intrusion detection or the analysis of the log messages 191 and 30 IDS candidates are authorized by the variable RN 214. In act 1003, these 30 IDS candidates may all apply to store their identity in the context of the registration information in the variable IdentVar 215. The first three candidate IDSs that manage to register themselves obtain the authorization to receive the log messages for analysis via the channel 302. The selection of the three IDSs is random, because it is not possible to determine which mining node 121 of the blockchain infrastructure 129 will solve the associated cryptographic puzzle (for storing the variable IdentVar 215 in the block 203) and thus which IDSs ultimately obtain the authorization.

In this regard, double security may thus be achieved: the determination of the result value, e.g., of the variable 214 RN, includes the random contribution; moreover, when storing the registration information in the form of the variable 215 IdentVar, there is also competition, the outcome of which is not determined a priori. A manipulation to give preference to a compromised IDS 111-1-111-3 is therefore difficult or not possible.

This will be described in even further detail below. Those preselected IDSs 111-1-111-3 attempt to enable the storage of their public key as public, cryptographic key material, or their certificate or the hash over these values in the smart contract 220 under the variable 215 IdentVar by mining nodes 121-1-121-3. That means that registration information, which is indicative of the identity of the IDSs 111-1-111-3, is stored in the blockchain 200. For this purpose, the IDSs 111-1-111-3 instruct the mining nodes 121-1-121-3 that they are intended to implement the function register_pubkey( ) of the smart contract 220 D1Contr. In addition, the IDSs 111-1-111-3 send the following input parameters for the function register_pubkey( ) to the mining nodes 121-1-121-3: PublicKey+GasPrice+UniqID. That corresponds to block 2003 from FIG. 2. Instead of public keys, the certificate, or the hash of the values may also be sent as input parameters of the function register_pubkey( ) to the mining nodes 121-1-121-3 in order to enable registration thereof in the variable 215 IdentVar.

The variable 215 IdentVar may be realized as an array having the length x in the smart contract 220, which array may store y bits in each case. In one example, if the SHA-256 hash of the certificate is intended to be communicated as an input parameter of the function register_pubkey( ) to the mining nodes 121-1-121-3 and if three IDSs 111-1-111-3 are intended to be authorized to carry out the final analysis, then it is possible to choose x as 3 and y as 256.

If x=3, then only three IDSs 111-1-111-3 may enable their storage for the analysis of the log messages 191 in the smart contract 220. Because it is not certain which mining node 121-1-121-3 may solve the cryptographic puzzle, the IDSs 111-1-111-3 which have been registered may be regarded as random.

This random component prevents attackers who are in control of some IDSs 111-1-111-3 from being able to register themselves in a targeted manner for the analysis of specific computer systems 111. Moreover, it is also possible to prevent an IDS 111-1-111-3 from paying an excessively high gas price in order to be able to register itself for enabling the random element to be canceled out, because all mining nodes 121-1-121-3 would be glad to earn a large amount and might give preference to the registration desires of the attackers.

A public-key infrastructure may be used to verify whether the IDSs 111-1-111-3 have actually been preselected or are permitted to send the application to cause the variable 215 IdentVar to be registered. This public-key infrastructure validation of the certificates/public key may be carried out by the smart contract 220 or by the oracle 161 or by the computer system 101 or natively by the mining node 121-1-121-3.

Because it is not certain whether the mining nodes 121-1-121-3 will be successful, security against replay attacks may be desirable. In order to prevent replay attacks, the UniqID is also used as input parameter for the function register_pubkey( ).

The IDSs 111-1-111-3 may also have the function of a computer system 101 and also participate in the blockchain 200 in order to have their own log messages checked by other nodes of the blockchain infrastructure. What is thus achieved is that the amount of money in the system circulates between all the computer systems, and thus, in the long term, the mutual analyzing of the log messages functions in a stable manner without money constantly having to be transferred into the system externally. Therefore, the money does not disappear and is retained for the community. The money merely constantly changes hands between the computer systems 101.

It is evident from the description above that the mining nodes 121-1-121-3 may thus be configured for implementing the smart contract 220 in order to obtain the corresponding result in the form of the variable 214 RN. Depending on this variable 214 RN, it is then possible for one of the IDSs 111-1-111-3 to be selected and, (e.g., taking account of an application and a cryptographic puzzle), for the selected IDS 111-1-111-3 to be granted a corresponding authorization 193.

The identification of the computer system 101 in the form of the IP address as variable 213 is also stored in the blockchain. All this may then be used by the one or more selected IDSs 111-1-111-3 in order subsequently to carry out the analysis. Corresponding examples have been described in association with FIG. 2 (blocks 2002 and 2004), and will also be described in greater detail below, specifically in association with act 1004.

In act 1004, it is assumed that in block 203 the variable 215 IdentVar now contains three entries. These entries correspond to the authorization 193 that three specific IDSs 111-1-111-3 (from a large number of candidate IDSs) are intended to carry out the analysis of the computer system 101. For this reason, precisely these IDSs 111-1-111-3, via an end-to-end secure channel 302, establish the connection to the computer system 101 with the aid of the IP address (IPAddr) and authenticate themselves with their public key or certificate. That is to say that the selected IDSs 111-1-111-3 transmit a corresponding request. The latter is also indicative of the register information of the respective IDS 111-1-111-3 previously stored in the blockchain 200, e.g., the public cryptographic key and/or the certificate. The computer system 101 checks whether the public key or the certificate matches the entries in the variable 215 IdentVar and permits the connection (additionally optionally, if necessary, the computer system 101 may validate the public key or the certificate of the respective IDSs 111-1-111-3 with a PKI). Starting from this point in time, the machine-learned algorithm D1M and the log messages 191 are transferred from the computer system 101 to the IDSs 111-1-111-3. The IDSs 111-1-111-3 analyze the log messages with the machine-learned algorithm and store the result either immediately, or only if an attack has been detected, or later at the end of the period D1Time in the blockchain 200 (see block 204) under the variable 216 Result or as soon as possible. The result of the analysis is thus stored in the blockchain 200 and/or may be forwarded directly to the administrator and/or the oracle and/or a third entity.

Some optional implementation details in association with act 1004 are described below.

The log messages 191 may be transferred on a block (e.g., always 1 megabyte) for analysis. However, the log messages may also be transferred as a stream (e.g., log message stream). That is to say that as soon as a log message 191 has been generated by the computer system 101, it is transmitted to the IDSs 111-1-111-3 via the end-to-end channel 302. An advantage of the second method is that an attacker cannot cover up the trace of the attacker's attack by a log message stream, because the log messages 191 have already been transferred to the selected IDSs 111-1-111-3. If the log messages were all transferred as a whole, then there is the possibility that the attacker, before the next transfer, may erase any trace of the attacker from the log messages and would thus remain undiscovered.

The IDSs 111-1-111-3 also obtain further parameters such as the machine-learned algorithm, for example via the end-to-end channel. The authenticity and integrity of the machine-learned algorithm may be checked by way of the variable 211 D1M in the smart contract 220. It is also possible to store the machine-learned algorithm as such in the variable 211 DIM. If this is the case, the machine-learned algorithm does not have to be transferred via the end-to-end channel or the machine-learned algorithm does not have to be transferred from a third entity.

A public-key infrastructure may be used to verify whether the IDSs 111-1-111-3 are actually authorized to analyze the log messages 191 and therefore to establish an end-to-end channel to the computer system 101. This public-key infrastructure validation of the certificates and/or of the public key may be carried out by the smart contract 220 or by the oracle 161 or by the proxy and/or by the computer system 101, (e.g., in the case of the computer system 101, at the time of establishing communication of the end-to-end channel).

The results of the analysis may either be stored with a MultiSig smart contract 220 in the blockchain 200 or each IDS 111-1-111-3 verifies the integrity of the log messages 191 separately in a new block by storing the result in the variable 216 Result of the smart contract 220. The variable 216 Result may be an array having x free storage locations (x=3 in our application example).

Because the public key of the IDSs 111-1-111-3 is stored in the variable 215 IdentVar, only these IDSs 111-1-111-3 may describe the variable 216 Result. The description is effected once again by way of the mining nodes 121-1-121-3.

In summary, a description has been given above of techniques for carrying out an analysis of the log messages 191 in association with the intrusion detection on a decentralized architecture based on smart contracts 220 and the blockchain 200. This is different than reference implementations in which log messages 191 are created and are analyzed centrally on a trustworthy entity. By the techniques described herein, such a central entity may be replaced by the decentralized architecture based on the smart contracts 220 and the blockchain 200. Moreover, the techniques described herein make it possible to considerably reduce the size of the smart contracts 220, thereby reducing the operating costs for mining. An attacker cannot manipulate the analysis of the log messages 191 or may manipulate it only with difficulty, even if the attacker has gained control over the computer system 101.

In accordance with various examples, the analysis of the log messages 191, for example with a machine-learned algorithm, is not carried out by the computer system itself. This is based on the insight that the computer system itself might be compromised under certain circumstances. The techniques described herein make it more difficult for the attacker to be able to gain control of the majority of all subscribers of the blockchain infrastructure 129, e.g., the mining nodes 121-1-121-3 and the IDSs 111-1-111-3, in order to falsify the intrusion detection in this way. In specific terms, that means, in the case of a proof-of-work-based blockchain 200, the attacker has to control more than 50% of all the computational capacity (50% hurdle) in order to be able to store incorrect results in the blockchain 200. This hurdle may be reduced to 33% under certain circumstances. In the case of a proof-of-stake-based blockchain 200, the attacker has to control more than 50% of the system currency in order to be able to store incorrect results in the blockchain 200. Moreover, incorrect calculations cause penalty payments in this technology, as a result of which the attack might become economically unattractive.

The attacker cannot control which IDS 111-1-111-3 is stored in the blockchain 200 (variable 215 IdentVar) and is thereby authorized (variable 214 RN, random number) to carry out the analysis. Therefore, the attacker has hardly any chance of manipulating the results of the analysis.

By countermeasures such as gas price windows or constant gas price values, the attacker cannot pay an excessively high gas price in order to be given preference by the mining node. Moreover, the variable 214 RN makes it more difficult here, too, in that the attacker cannot choose when the latter will have the chance to apply to the mining nodes 121-1-121-3 for the analysis of the log messages.

In the case of a stream of log messages 191, the attacker has no chance to erase the presence of the attacker or the attack process from the log messages 191 because the latter have already been transferred to the IDSs 111-1-111-3. As a result, it is possible to reconstruct what happened and how the attack was implemented. In the case where the log messages are transferred to the oracle or the proxy, the hurdle for erasing the presence of the attacker or the attack process from the log messages 191 is very high because the latter have already been transferred to the oracle or the proxy, and thus to the IDSs 111-1-111-3 in an integrity- and authenticity-protective manner. As a result, it is possible to reconstruct what happened and how the attack was implemented.

A further advantage concerns integrity protection. Specifically, results of the analyses are stored in the blockchain 200 and therefore cannot be altered by attackers afterward. All subscribers of the blockchain infrastructure 129 may see which computer system 101 exhibits trustworthiness/integrity and which does not.

A further advantage concerns confidentiality. Specifically, the content of the log messages cannot be read by subscribers if the log messages are transferred from the computer system 101 to the IDS 111-1-111-3 in a confidential and authentic/integrity-protective manner. The subscribers and man-in-the-middle attackers may only see the results of the analyses and reconstruct whether a computer system 101 has been attacked or not. Only the authorized IDSs 111-1-111-3 may read the log messages 191.

A further advantage concerns scalability and maintenance. Specifically, easy extendibility of the peer-to-peer blockchain architecture. The blockchain community, rather than the operator, is responsible for all the problems of scaling and maintenance.

A further advantage concerns the size of the smart contracts 220 and the costs for operating the blockchain 200. The size of the smart contracts 220 is reduced and the operating costs are therefore reduced. In specific terms, that means the reduced computational complexity of the smart contracts 220 has the effect that the mining nodes are paid considerably less as a result. Moreover, as a result of the reduced size of the smart contracts 220, a technique described herein may be operated even on lightweight infrastructures. A further advantage concerns reduction of costs. Specifically, minimal costs on the part of the operator (no redundancy mechanisms, no central server need be operated, no high-performance system is required, no experts are needed to maintain the blockchain infrastructure, and previously impossible business cases may become economically tenable with a blockchain-based architecture).

The techniques described herein may be used in a variety of applications. A few application scenarios are described by way of example below. A first exemplary application scenario concerns building technology. Here, IoT devices may analyze anomalies or log messages by way of smart contracts. Examples of IoT devices may include an intelligent building controller, sensors, or actuators, etc. A further application scenario concerns the process industry and drives, energy management, and the digital factory. Specifically, industrial components may cause themselves to be controlled by other industrial components by way of the blockchain. This may be useful in automation technology, drive technology, industrial software, and for services. A third application scenario concerns mobility. Specifically, signal and control technology in rail bound passenger and freight traffic, electrification solutions for railroad and road traffic, road traffic control and information systems, parking space management, and electronic payment and toll systems for road traffic and long-distance traffic may be safeguarded by such techniques described herein.

The features of the above-described embodiments and aspects of the disclosure may be combined with one another. In particular, the features may be used not only in the combinations described, but also in other combinations or by themselves, without departing from the scope of the disclosure.

For example, a description has been given above of various examples in which an analysis for intrusion detection is based on a machine-learned algorithm. This is only one example, however. In other examples, e.g., a statistical algorithm or anomaly detection may be used.

For example, a description has been given above of various examples in which a channel 302 is created between computer system 101 and IDS 111. This is only one example, however. In other examples, e.g., the communication between the computer system 101 and the IDS 111 may be tunneled via an oracle or a proxy.

In the various examples described herein, the algorithm may be determined by an oracle or a third entity.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An analysis device comprising:
a hardware processor; and
a communication interface,
wherein the hardware processor is configured to load program code from a memory and to execute the program code,
wherein, when the program code is executed, the hardware processor is configured to:
communicate with at least one node of an infrastructure of a distributed database via the communication interface and obtain an authorization for intrusion detection for a computer system;
carry out the intrusion detection for the computer system following the obtaining of the authorization, wherein the intrusion detection is based on an analysis of log messages of the computer system received from the computer system via the communication interface; and
carry out an application for storing registration information indicative of an identity of the analysis device, in the distributed database, depending on a result value of a smart contract implemented by the at least one node.

2. The analysis device of claim 1, wherein the authorization is based on the result value of the smart contract implemented by the at least one node.

3. The analysis device of claim 1, wherein the hardware processor is furthermore configured to:
transmit a request for carrying out the intrusion detection to the computer system, wherein the request is indicative of the registration information.

4. The analysis device of claim 3, wherein the request comprises at least one from a public cryptographic key material and/or a certificate of the analysis device.

5. The analysis device of claim 1, wherein the hardware processor is furthermore configured to:
look up in the distributed database to obtain the result value; and
compare the result value with the registration information.

6. The analysis device of claim 5, wherein the application is carried out based on the comparing of the result value with the registration information.

7. The analysis device of claim 1, wherein the analysis of the log messages is based on at least one machine-learned algorithm.

8. The analysis device of claim 1, wherein the hardware processor is furthermore configured to:
store a result of the analysis of the log messages in the distributed database.

9. The analysis device of claim 1, wherein the log messages are received via an end-to-end communication channel directly from the computer system or via a proxy or an oracle.

10. An analysis device comprising:
a hardware processor; and
a communication interface,
wherein the hardware processor is configured to load program code from a memory and to execute the program code,
wherein, when the program code is executed, the hardware processor is configured to:
communicate with at least one node of an infrastructure of a distributed database via the communication interface and obtain an authorization for intrusion detection for a computer system;
select at least one machine-learned algorithm based on a corresponding entry in the distributed database or based on the authorization; and
carry out the intrusion detection for the computer system following the obtaining of the authorization, wherein the intrusion detection is based on an analysis of log messages of the computer system received from the computer system via the communication interface, and wherein the analysis of the log messages is based on the selected at least one machine-learned algorithm.

11. The analysis device of claim 10, wherein the authorization is based on a result value of a smart contract implemented by the at least one node.

12. The analysis device of claim 10, wherein the hardware processor is furthermore configured to:
transmit a request for carrying out the intrusion detection to the computer system, wherein the request is indicative of registration information indicative of an identity of the analysis device.

13. The analysis device of claim 12, wherein the request comprises at least one from a public cryptographic key material and/or a certificate of the analysis device.

14. The analysis device of claim 10, wherein the hardware processor is furthermore configured to:
look up in the distributed database to obtain result value of a smart contract implemented by the at least one node; and
compare the result value with registration information indicative of an identity of the analysis device.

15. A system comprising:
an analysis device comprising at least one hardware processor and a communication interface, wherein the at least one hardware processor of the analysis device is configured to load program code from a memory and to execute the program code;
at least one node comprising at least one hardware processor; and
a computer system comprising at least one hardware processor,
wherein the hardware processor of the analysis device is configured to communicate with the at least one node of an infrastructure of a distributed database via the communication interface and obtain an authorization for intrusion detection for the computer system,
wherein the at least one hardware processor of the at least one node is configured to implement a smart contract and obtain a corresponding result value,
wherein the at least one hardware processor of the at least one node is configured to select the analysis device from a plurality of analysis devices based on the result value,
wherein the at least one hardware processor of the at least one node is configured to communicate with the analysis device via the communication interface and grant the analysis device the authorization for the intrusion detection for the computer system,
wherein the at least one hardware processor of the computer system is configured to receive registration information from the analysis device via the communication interface, wherein the registration information is indicative of an identity of the analysis device,
wherein the at least one hardware processor of the computer system is configured to initiate a verification of the registration information,
wherein the at least one hardware processor of the computer system is configured to transfer log messages of the computer system to the analysis device and via the communication interface based on a result of the verification,
wherein the at least one hardware processor of the analysis device is configured to carry out the intrusion detection for the computer system following the obtaining of the authorization from the at least one node, wherein the intrusion detection is based on an analysis of log messages of the computer system received from the computer system via the communication interface, and
wherein the at least one hardware processor of the analysis device is further configured to carry out an application for storing the registration information indicative of the identity of the analysis device, in the distributed database, depending on the result value of the smart contract implemented by the at least one node.

* * * * *